May 4, 1965

L. C. H. JUY 3,181,383

CHANGE SPEED GEAR CONTROL DEVICES FOR BICYCLES
AND SIMILAR CHAIN DRIVEN VEHICLES

Filed March 19, 1963

3 Sheets-Sheet 1

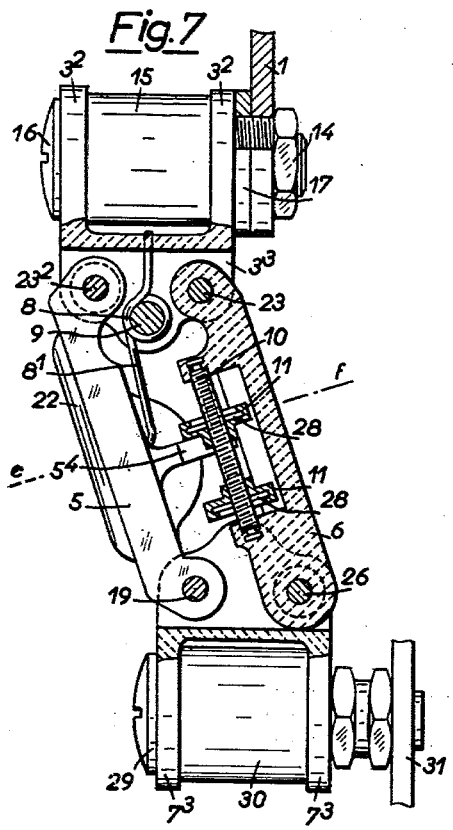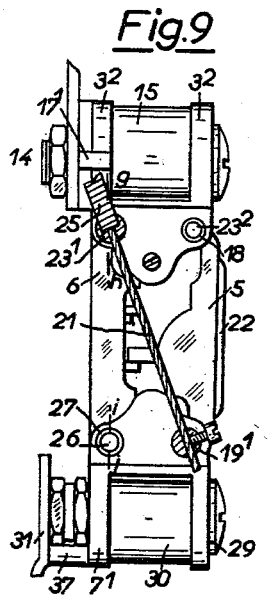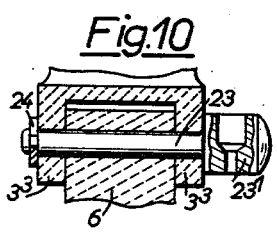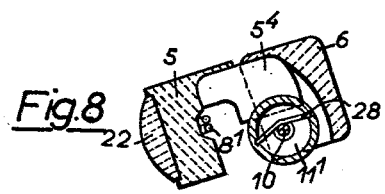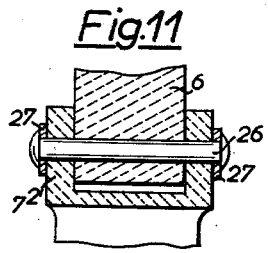

United States Patent Office 3,181,383
Patented May 4, 1965

3,181,383
CHANGE SPEED GEAR CONTROL DEVICES FOR BICYCLES AND SIMILAR CHAIN DRIVEN VEHICLES
Lucien Charles Hippolyte Juy, 75 Rue General Fauconnet, Dijon, Cote d'Or, France
Filed Mar. 19, 1963, Ser. No. 266,388
Claims priority, application France, Apr. 20, 1962, 8,427
6 Claims. (Cl. 74—217)

This invention relates to change speed gear control devices for bicycles, tandems, motorized bicycles, motorcycles and similar chain driven vehicles.

According to the invention there is provided a change speed gear control device for a bicycle or like chain driven vehicle, comprising a normally upper support and normally lower support, a first resilient pivotal connection between said upper support and a frame member of the vehicle or a lug secured to a frame member of the vehicle, a second resilient pivotal connection between said lower support and a chain guide assembly for moving a chain of the vehicle transversely from one sprocket to another, a parallel linkage between said upper and lower supports affording lateral movement of said lower support with respect to said upper support during a gear changing operation, each of said supports being moulded from a synthetic plastic material and in the form of a double yoke having a base from which two sets of oppositely disposed flanges project, there being a first set of such flanges forming a mounting for the associated resilient pivotal connection, and a second set of such flanges connected to said parallel linkage, the arrangement being such that the control device can be operated to displace the lower support and the chain guide assembly laterally to effect a corresponding transverse movement of the chain.

Figure 1:
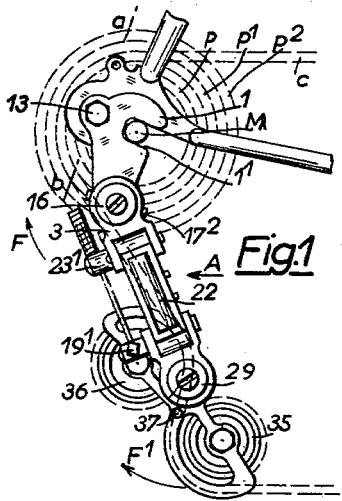
Figure 2:
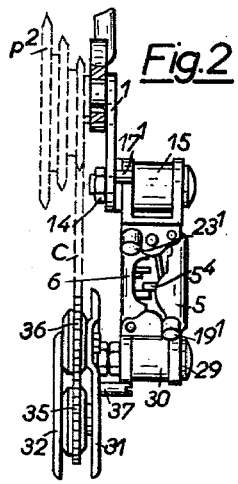
Figure 3:
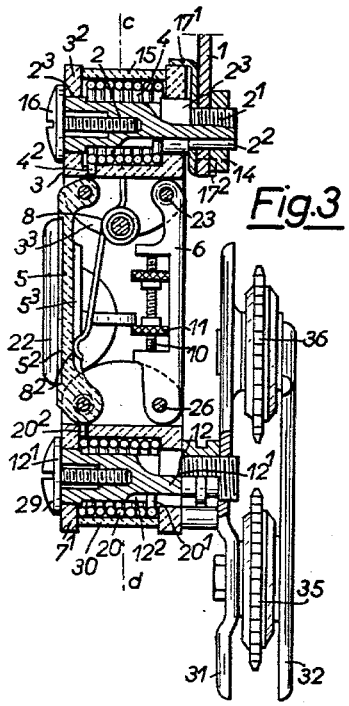
Figure 4:
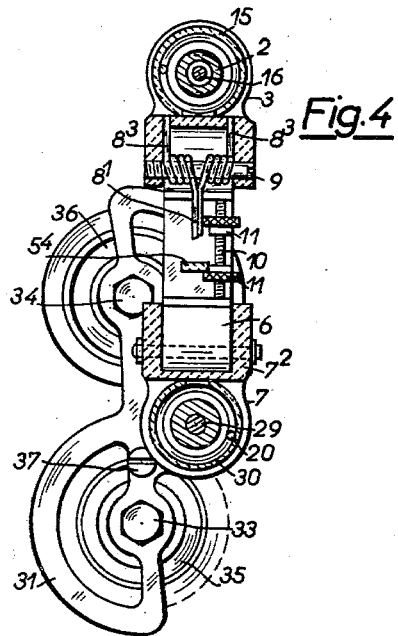
Figure 5:
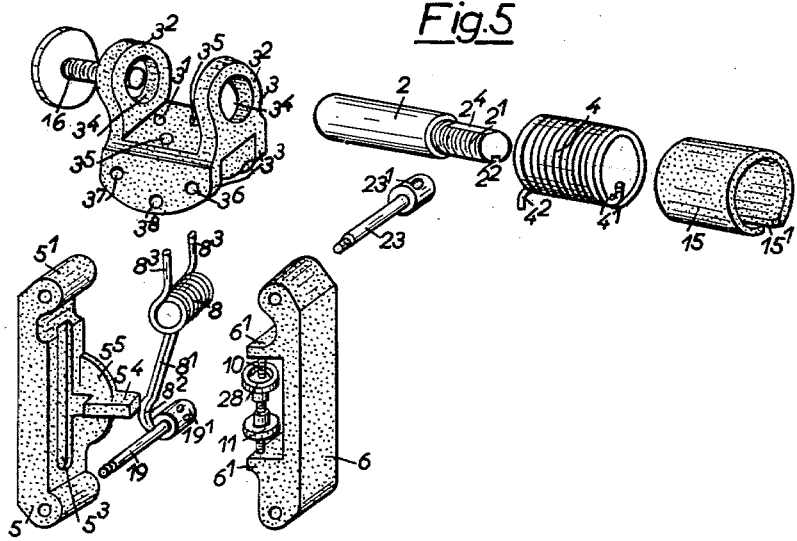
Figure 6:
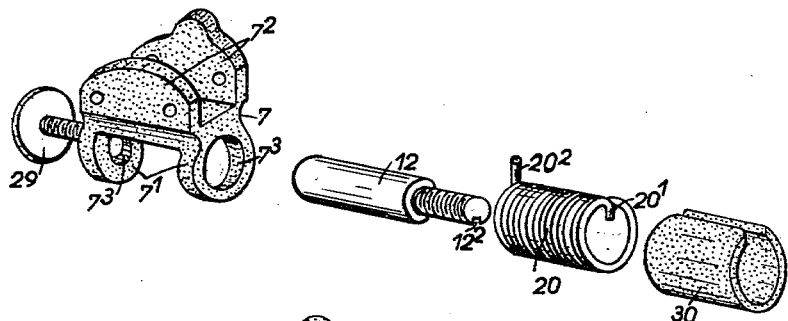
Figure 6:
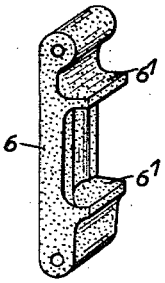

For a better understanding of the invention and to show how the same may be carried into effect reference will now be made, by way of example, to the accompanying drawings, in which:

FIGURE 1 is a view of a change speed gear control device assembly according to the invention, FIGURE 2 is a front view of the control device illustrated in FIGURE 1, part of the frame of the bicycle to which it is attached being sectioned along the line a–b of FIGURE 1, FIGURE 3 is a cross-sectional view, drawn to a larger scale, of the control device as seen in the direction of the arrow A FIGURE 1, FIGURE 4 is a sectional view taken along the line c–d of FIGURE 3, FIGURE 5 is an exploded perspective view of some of the various members of the control device, FIGURE 6 is an exploded perspective view of part of the assembly, FIGURE 7 is a view, drawn to a larger scale and partially in section, of a further detail of the control device, FIGURE 8 is a plan view, in section, taken along the line e–f of FIGURE 7, FIGURE 9 is a view of the control device illustrating the mounting and securing of a control cable, FIGURE 10 is a sectional view, taken along the line g–h of FIGURE 9 and FIGURE 11 is a sectional view taken along the line line i–j of FIGURE 9.

Referring to the drawings the change speed gear control device according to the invention includes a securing lug 1 which is associated with means for the articulation and resilient pivotal control of a normally upper support 3 of synthetic plastic material. The lug 1 is formed with an open slot $1^1$ for engagement in adjustable manner on a projecting portion M of the rear hub of a bicycle. The lug 1 is arranged to carry at its free end a pin 2 which extends substantially perpendicularly to said lug, such pin 2 having mounted thereon the upper support member 3. A number of stepped sprockets, indicated by the references $p$, $p^1$ and $p^2$, are arranged on the hub and are adapted to engage the transmission chain C. A nut and bolt system 13 angularly locks the support lug 1 against that part of the frame which carries the hub.

One end of the pin 2 is screw-threaded at $2^2$ and is secured to the lug 1 by means of a nut 14. Around the smooth shank of the pin 2 there is disposed a compression spring 4, one end $4^1$ of which latter projects inwardly and is engaged in a longitudinal slot $2^2$ formed in the pin 2 thus preventing angular movement of the spring 4 around the pin 2. The other end of the compression spring 4 is also bent so as to form an outwardly projecting finger $4^2$ for engagement in a corresponding aperture $3^1$ in the upper support member 3.

The upper support member 3 is in the form of a double yoke having a base portion, from the opposite ends of which project two upstanding flanges $3^2$ which are parallel. Two further flanges $3^3$, which are also parallel to one another project downwardly from the base portion from the two opposite sides. The flanges $3^2$ are formed with aligned apertures $3^4$ for the reception of the pin 2, the compression spring 4, in the assembled condition, being disposed between the flanges $3^2$ and surrounded by a cover 15 of synthetic plastic material which is longitudinally slotted at $15^1$.

A portion of the pin 2 remote from the screw-threaded portion $2^2$ is formed with a longitudinally extending bore which is screw-threaded for the reception of a screw 16 having an enlarged head portion which forms an abutment for the flange $3^2$ of the support 3.

A metal washer 17 is mounted on the screw-threaded end $2^2$ of the metal pin 2 between the lug 1 and the support 3. The pin 2 is formed with one or more flats $2^4$ which co-operate with corresponding flats in the axial aperture of the washer 17 thus preventing the latter from undergoing angular movement around the pin 2. The washer 17 is further formed with tongues $17^1$ and $17^2$ which extend perpendicularly from the periphery thereof at diametrically opposite locations. These tongues $17^1$ and $17^2$ project on opposite sides of the washer 17 and form abutments which limit angular movement of the support 3.

With this arrangement, it is therefore possible to twist coil spring 4 so as to bring about the pivoting of the support 3 together with the gear speed change assembly, in a clockwise direction, as indicated by the arrow F of FIGURE 1, such pivoting movement causing the chain to be tensioned. The tongue $17^2$ of the washer 17 bears and is permanently stopped on the rounded profile of the lug 1, whereas the tongue $17^1$, which co-operates with the profile of the corresponding side $3^2$ of the support 3, constitutes a positioning abutment limiting the rearward pivoting of the change-speed gear during the disassembly of the rear wheel.

This can be effected in substantially the same manner directly on a frame lug having at its base a boss which is perforated so as to permit the engagement of the screw-threaded end $2^1$ of the metal pin 2. In this case, the metal lug 1 is dispensed with.

The lower flanges $3^3$ of the support member 3 are formed with three sets of aligned apertures $3^6$, $3^7$ and $3^8$ each of which is adapted to receive a pin 23, and 9 respectively. The pins 23 and 17 are arranged to act as pivots for a parallel linkage consisting of two profiled levers 5 and 6 which carry at their opposite ends a further, normally lower, support member 7 which is identical to the support member 3. The arrangement of the levers 5 and 6 with the support members 3 and 7 is such that an articulated parallelogram is provided.

The outer lever 5 of flat shape terminates in two bosses $5^1$, which are engaged between the flanges $3^3$ and $7^2$. The upper boss is articulated on a hollow metal pin 17 which has an upset end and which bears against the flanges 3³ via washers 18. At its base, the outer lever 5 is articulated on a metal pin 19 extending through the flanges 7² and is maintained, at its end, by a removable circlip. The pin 19 has a head portion 19¹ which permits the securing thereto of one end of a control cable 21.

The outer lever 5 is formed with a slight cavity 5² permitting the insertion of an advertisement plate 22 preferably made of plastic and secured by means of an adhesive by welding or by any other suitable means. On its inner face, the lever 5 is formed with a longitudinally extending groove 5³ serving as a means for guiding a curved end 8² of a recall spring 8. Transversely located relatively to the groove 5³ is a support heel 5⁴ which is reinforced by opposite ribs 5⁵. The support heel 5⁴ protrudes horizontally into a space provided in the profiled lever 6 so as to co-operate with the system for adjusting the oscillation amplitude of the assembly. The recall spring 8 is mounted on the metal pin 9 which is screwed transversely through the set of holes 3⁸ formed in the flanges 3³ of the support 3. The spring 8, which operates in torsion, forms in its central portion two juxtaposed strands 8¹, the curved ends of which constitute a projection 8² which engages the groove 5³. On the opposite side, the strands 8¹ are wound helically in opposite directions and terminate in upwardly projecting fingers 8³ which engage in corresponding apertures 3⁵ formed in the base portion of the support 3. In this way the projection 8² exerts a permanent force which tends to urge the normally lower end of the lever 5 outward and thus provides for the recall of transverse displacements.

The inner profiled lever 6, is pivoted at its upper portion on the metal pin 23 which extends through the apertures 3⁶ formed in the sides 3³ of the support 3. The pin 23, which is retained at its end by a removable circlip 24, has at the opposite end a head 23¹, which is apertured to form a stop for a sheath 25 of the cable 21, while the passage of the control cable 21 is permitted. At its base, the lever 6 is pivoted on a hollow metal rivet 26 which is secured to the support member 7 by upsetting an end of the rivet support washer 27 being provided between the ends of rivet 26 and the flanges 7³ of support 7.

On its front face, the lower lever 6 is formed with two transverse bosses 6¹ disposed parallel so as to support a screw-threaded rod 10 the ends of which are embedded during the moulding process in the plastic material. The screw-threaded rod 10 can also be fitted on the lever 6 and secured by welding the material, or by any other means. Shouldered nuts 11 are screwed on the rod 10 on both sides of the support heel 5⁴ of the outer lever 5 in such manner that in one direction or in the other, the adjustable nuts 11 constitute abutments limiting the transverse displacement of the chain-guide assembly.

The adjustable nuts 11 are held in position along the screw-threaded rod 10 through the agency of springs 28 disposed in circular chambers 11¹ formed within the knurled collar. The said spring wires 28, which are diametrically engaged in corresponding apertures, exert a tangential pressure within the screw-thread of the rod 10, thus mitigating unintentional rotation of the nuts 11 caused for example by vibrations. The metal nuts 11 also project externally relatively to the inner lever 6, so as to facilitate the manipulation thereof.

This adjustment device permits the transverse adjustment of the chain-guide assembly and limits the extreme pivoting positions.

The lower support 7, which is identical to the support 3, permits, by means of the axial apertures 7³ formed in the sides 7¹, the centering and free rotation of the metal pin 12. The pin 12 has arranged around it a coil spring 20 acting in torsion and having a curved end 20¹ which forms an inner finger and is engaged in a longitudinal slot 12² formed in the pin 12. The other end of the coil spring also has a finger 20² which projects externally thereof so as to engage in a corresponding aperture formed in the base portion of the support 7.

A stop screw 29, similar to screw 16, is secured into a screw-threaded bore formed in one end of the pin 12. An enlarged head portion of the screw 29 forms a longitudinal abutment for the corresponding flange 7¹ of the lower support 7 without, however, preventing the free angular displacement of the said pin 12. A protective cover 30 of plastic material surrounds the coil spring 20 and is longitudinally slotted to permit the passage of the finger 20².

The opposite end of the pin 12 is secured to a flange 31 of any desired moulded material and which may be cut or stamped, and which is appropriately profiled so as to maintain, in co-operation with a corresponding counter-flange 32, pivots 33 and 34 carrying two chain-guide rollers 35 and 36 mounted for free rotation. This flange and counter-flange assembly, with pivot and rollers, constitutes the chain-guide.

The circular tension imparted to the coil spring 20 tends to entrain in rotation the chain-guide assembly in the direction of the arrow F¹ of FIGURE 1, so as thus to tension the chain C in combination with the pivoting of the change-speed gear control device in the direction of the arrow F. In order to forwardly limit the oscillation amplitude of the pin 12, a stop means in the form of a rod 37 secured on the flange 31 abuts against the profile of the lower support 7.

The transverse displacements of the lower support 7 and consequently of the chain-guide assembly are obtained, in the sense of displacement towards the large pinion $p^2$, by any known system involving a lever or the like and acting in tension on the control cable 21 guided and protected by the sheath 25. The cable 21 acts on the head 19¹ of the metal pin 19 so as thus to control the pivoting of the levers 5 and 6.

In the opposite direction, the spring 8 provides for the recall of the chain-guide assembly towards the small pinion $p$.

According to the present invention the upper and lower supports 3 and 7 together with the two levers 5 and 6 are formed of a synthetic plastic material which may or may not be provided with metallic reinforcing strips embedded in the plastic material during the moulding thereof.

A change speed gear control device as described above is characterised in:

(1) A diminution in the risk of corrosion by the elimination of metal elements,
(2) A reduction in weight,
(3) Silent operation,
(4) A more gentle manipulation and less chance of wear.

It is to be understood that the invention is in no way limited to the embodiments described above but covers all variations falling within the scope of the appended claims.

The synthetic plastic material to be employed in the above described device may be an acetal polymer such as for instance a homopolymer acetal resin.

I claim:

1. A change speed gear control device for a chain driven vehicle, including a normally upper support constituted solely of synthetic plastic material and a normally lower support constituted solely of synthetic plastic material, each of said supports including a base portion and two opposite sets of flanges projecting from each base portion, a metal pin associated with a first set of flanges of said upper support for pivotally mounting said upper support on a frame member of the vehicle, a chain guide assembly, a second metal pin associated with a first set of flanges of said lower support for pivotally mounting said chain guide assembly on said lower support, two levers of synthetic plastic material constituting a parallel linkage connecting a second set of flanges of said upper support to a second set of flanges of said lower support for moving said lower support laterally with respect to said upper support, a compression spring associated with each metal pin, one end of each spring being engaged in a groove in a corresponding pin, the opposite end of said spring cooperating with the corresponding support member, pins carried by the second set of flanges of each support and pivotally supporting said two levers, a further pin carried by one of said set of flanges, a torsion spring mounted on said further pin, said spring comprising two oppositely wound coils and two juxtaposed limbs projecting centrally from said coils guidably received in a recessed portion of one of said levers, a cable secured to one of said lever support pins, a sheath surrounding said cable and secured to a second of said lever support pins whereby relative axial movement of said cable in said sheath causes angular displacement of said parallel linkage, first stop means operatively associated with the upper support for limiting pivotal movement of the upper support relative to said frame member, second stop means operatively associated with the lower support for limiting pivotal movement of the chain guide means relative to said lower support, third stop means operatively associated with said linkage for limiting angular deformation of said parallel linkage, angularly adjustable means supported in said linkage for engaging with said third stop means for predetermining the limits of movement of said lower support relative to said upper support, said third stop means including a threaded rod, angularly adjustable flanged nuts screwed onto said threaded rod, said rod being supported by one of said levers, and a stop member supported on the other of the levers for engaging the nuts, two lugs on the said one lever formed during the moulding thereof, said lugs supporting the rod in transverse offset relationship relative to the said one lever and spring wires disposed in circular chambers in said flanged nuts for exerting tangential pressure within the screw thread of the rod whereby unintentional rotation of the nuts is prevented.

2. A change speed gear control device as claimed in claim 1, including a cover of synthetic plastic material enclosing each of said resilient pivotal connections.

3. A change speed gear control device as claimed in claim 2, wherein a screw-threaded bore is provided in each of said metal pins, and a screw including an enlarged head portion threaded in each said bore for retaining the corresponding support member on its associated pin.

4. A change speed gear control device for a chain driven vehicle, including a normally upper support and a normally lower support, each of said supports including a base portion and two opposite sets of flanges projecting from each base portion, a first resilient pivotal connection associated with a first set of flanges of said upper support pivotally mounting said upper support on a frame member of the vehicle, a chain guide assembly, a second resilient pivotal connection associated with a first set of flanges of said lower support pivotally mounting said chain guide assembly on said lower support, said chain guide assembly being effective for moving a chain of a vehicle transversely from one sprocket to another during a gear changing operation, two levers of synthetic plastic material constituting a parallel linkage connecting a second set of flanges of said upper support to a second set of flanges of said lower support for displacement of said lower support laterally with respect to said upper support, pins carried by the second set of flanges of each support and pivotally supporting said two levers, a further pin carried by one of said set of flanges, a torsion spring mounted on said further pin, said torsion spring comprising two oppositely wound coils and two juxtaposed limbs projecting centrally from said coils and guidably received in a recessed portion of one of said levers, a cable secured to one of said lever support pins, a sheath surrounding said cable and secured to a second of said lever support pins, whereby relative axial movement of said cable in said sheath causes angular displacement of said parallel linkage, first stop means operatively associated with the upper support for limiting pivotal movement of the upper support relative to said frame member, second stop means operatively associated with the lower support for limiting pivotal movement of the chain guide means relative to said lower support, third stop means operatively associated with the linkage for limiting angular deformation of said parallel linkage, angularly adjustable means supported in said linkage for engaging with said third stop means for predetermining the limits of movement of said lower support relative to said upper support, said third stop means including a threaded rod, angularly adjustable flanged nuts screwed onto said threaded rod, said rod being supported by one of said levers, and a stop member supported on the other of the levers for engaging the nuts, two integral lugs on the said one lever, said lugs supporting the rod in transversely offset relationship relative to the said one lever, and spring wires disposed in circular chambers in said flanged nuts for exerting tangential pressure within the screw thread of the rod whereby unintentional rotation of the nuts is prevented.

5. A change speed gear control device as claimed in claim 4, including a cover of synthetic plastic material enclosing each of said resilient pivotal connections.

6. A change speed gear control device as claimed in claim 5, wherein a screw-threaded bore is provided in each of said metal pins, and a screw including an enlarged head portion threaded in each said bore for retaining the corresponding support member on its associated pin.

References Cited by the Examiner
UNITED STATES PATENTS
2,445,125   7/48   Reyburn et al. _____ 151—26

FOREIGN PATENTS
1,258,146   2/61   France.

DON A. WAITE, *Primary Examiner.*